United States Patent
Wunsch

(10) Patent No.: US 6,521,155 B1
(45) Date of Patent: Feb. 18, 2003

(54) CHIMNEY-PIPE AND MANUFACTURE OF SAME

(76) Inventor: Horst Wunsch, Möwenweg 35, CH-8597 Landschlacht (CH)

(*) Notice: Subject to any disclaimer, the term of this patent is extended or adjusted under 35 U.S.C. 154(b) by 0 days.

(21) Appl. No.: 09/508,360

(22) PCT Filed: Sep. 9, 1998

(86) PCT No.: PCT/EP98/05739

§ 371 (c)(1), (2), (4) Date: May 25, 2000

(87) PCT Pub. No.: WO99/13271

PCT Pub. Date: Mar. 18, 1999

(30) Foreign Application Priority Data

Sep. 10, 1997 (DE) .......................................... 197 39 630
Nov. 19, 1997 (DE) .......................................... 197 51 051

(51) Int. Cl.⁷ ............................................... B29C 47/00
(52) U.S. Cl. ..................... 264/150; 264/918; 264/920; 264/177.19; 264/211; 454/1
(58) Field of Search ..................... 264/102, 177.19, 264/177.2, 237, 209.1, 348, 918, 920, 211, 508, 286, 150, 211.23; 366/75, 78; 425/113, 378.1, 379.1, 303, 305.1; 454/1

(56) References Cited

U.S. PATENT DOCUMENTS 4,526,831 A    7/1985    Hatchadoorian et al.

FOREIGN PATENT DOCUMENTS

CH    686082    12/1995
WO    9512784    5/1995

OTHER PUBLICATIONS

Patent Abstracts of Japan, vol. 012. No. 186 (C–500), May 31, 1988 & JP 62 290750A (Mitsubishi Rayon Co. LTD) Dec. 17, 1987.

*Primary Examiner*—Mark Eashoo
(74) *Attorney, Agent, or Firm*—Bachman & LaPointe, P.C.

(57) ABSTRACT

A process for manufacturing a plastic pipe from recycled crushed PET starting material includes kneading the starting material under the influence of heat while removing moisture therefrom so as to prevent hydrolysis of the PET material and thereafter feeding the mixture to an extruder and passing the extruded mixture to a corrugator while cooling at a temperature gradient of between −10° C./min and −50°/min so as to form a crystalline plastic pipe.

10 Claims, 6 Drawing Sheets

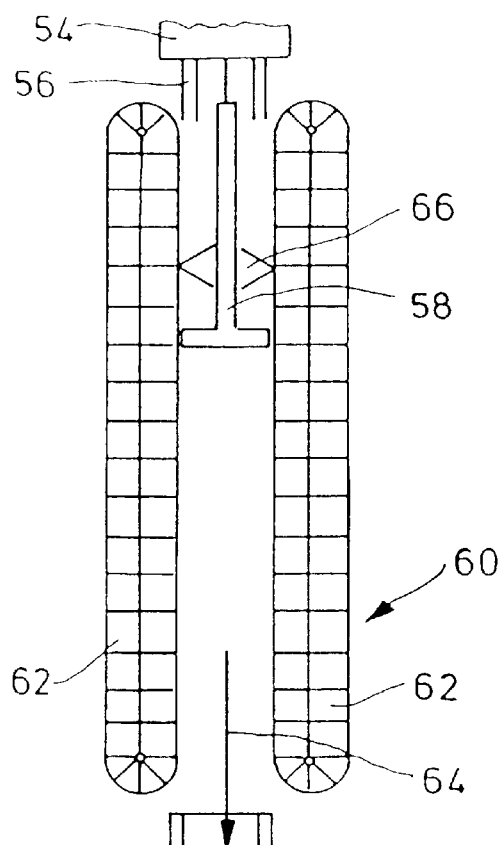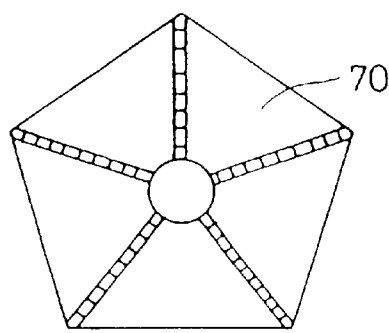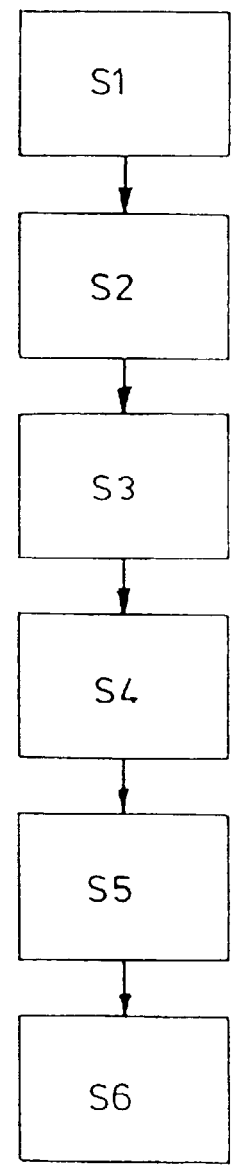

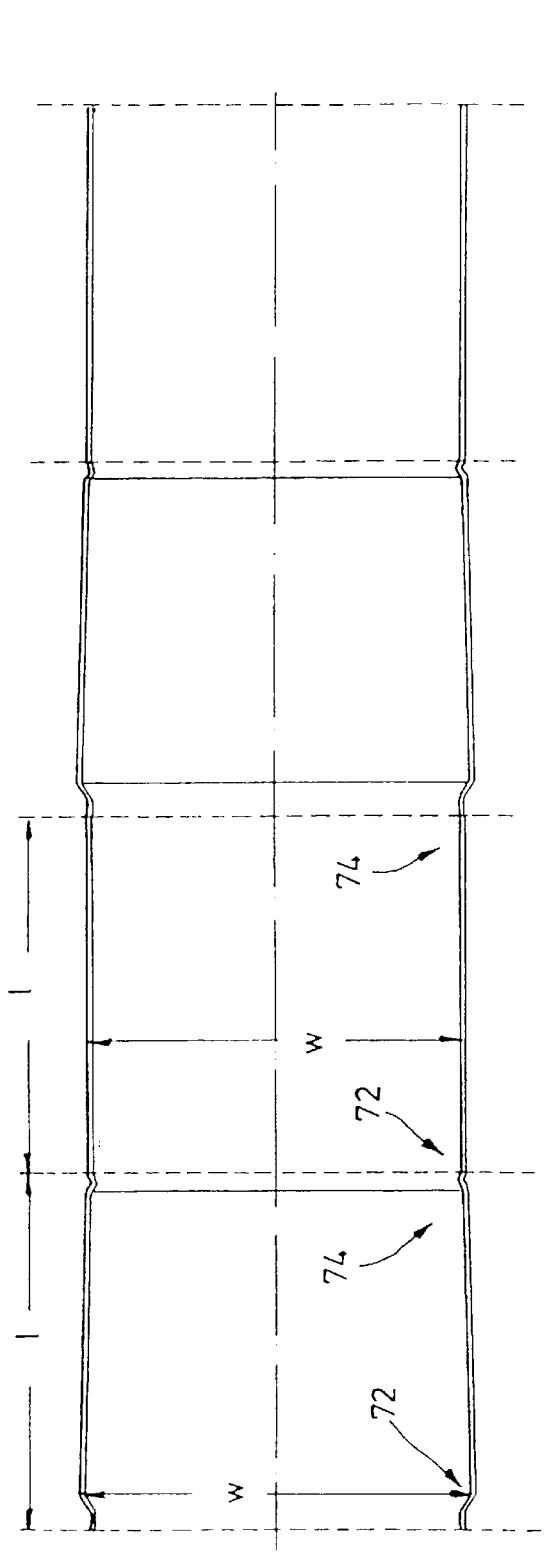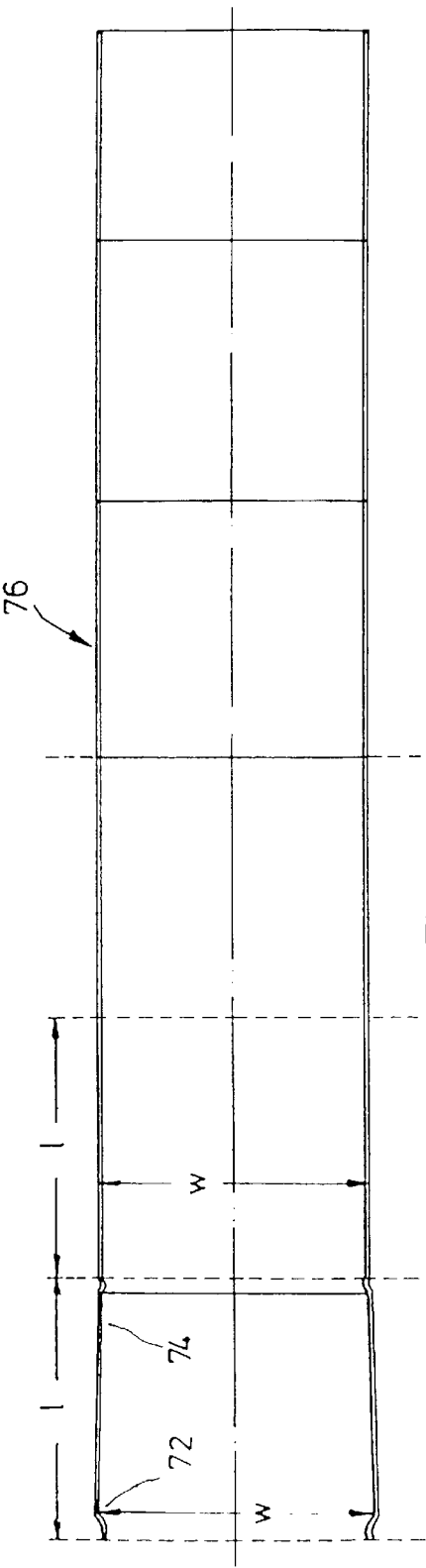

CHIMNEY-PIPE AND MANUFACTURE OF SAME

BACKGROUND OF THE INVENTION

The present invention concerns a chimney-pipe, a process for manufacturing a cylindrical or tubular moulding body of plastic, in particular chimney-pipes, furthermore a device particularly for carrying out the manufacturing process, as well as a use of the plastic material PET.

For about 10 years, the applicant has developed and sold plastic chimneys with high success, realized with the material PVDF. This tough and high temperature resistant material note only reaches the critical limit of 160° C. for exhaust temperatures, also, this material is sufficiently resistant to condensate, and is classified in fire-protection class V0.

As a result, such a plastic chimney has been established as a serious alternative to traditional chimney-pipes from stainless steel.

A disadvantage of such known plastic pipes, however, are the high manufacturing costs due to the expensive material and the critical manufacturing process; compared to stainless steel pipes, therefore, a PVDF chimney-pipe is competitive only to a limit extent.

Certain attempts have been made to find alternative plastic materials, as an example, PP or other thermal plastic materials have been used as input materials. Particularly for the intended, demanding application in the field of chimneys, however, such products have not proven sufficiently temperature resistant, nor up to the further requirements.

From Patent Abstracts of Japan, Vol. 012, No. 186 (C-500), 31.05.1998 (Publication No. 62290750) a tubular gas pipe is known produced as a moulding body of a PET plastic material which is present in crystalline state.

Furthermore, from CH-A-686 082 a moulding body of plastic is known which has been produced from a starting material showing PET pieces of crushed PET bottles.

Finally, from U.S. Pat. No. 4,526,831 the use of a PET-based plastic material in crystalline state is known for the production of car body parts, wheel rims and other elements related to the construction of vehicles.

SUMMARY OF THE INVENTION

The present invention has been developed with an aim of providing a chimney-pipe which, contrary to the common-type PVDF chimney-pipe, can be manufactured in an easier way, needs less expensive raw material and, with regard to its mechanical and physical properties, achieves at least the same efficiency as the latter one. Furthermore, a manufacturing process is to be provided for a chimney-pipe of this type as well as a device for the production of the same, and further fields of application have to be found for the material to be provided for according to this arm.

Advantageously, the used crystalline PET which has been produced according to the invention, offers exceptional mechanical properties and in particular can excellently cope with the ambient conditions prevailing within a chimney; moreover, PET as a raw material, from drinking bottles, for example, is available in large quantities and until now there has not been provided an appropriate process for using this recycled raw material.

Essential for the invention is the fact that the chimney-pipe contains the PET material (polyethylene terephthalate, also abbreviated as PETP) in crystalline state. While the plastic bottles which are referred to as initial products contain PETP in amorphous, transparent state, it is necessary to bring the PET into the crystalline state in order to achieve the desired and, according to the invention, advantageous high mechanical stability, toughness and temperature resistance; according to the invention this is achieved in particular by slowly cooling down the manufactured workpiece (contrary to that, in mass production PET bottles are manufactured by injection moulding and blowing as injection-molded parts, and after stretching, by supplying air, they are formed in a cooled and cold mould so that amorphous, transparent—and soft—material is produced).

In particular, (PET) material is also considered as being "crystalline" in the sense of the present invention if it does not show a complete but rather partial crystalline state. Such a partial crystalline state is also to be regarded as "crystalline" in the sense of the present invention as soon as, contrary to the amorphous state, advantageous strength properties can be achieved.

Essential for the invention is also the transparent PET produced by cooling down in a direct recycling process without the production of granulate, for applications without thermal load, such as cable conduits, drainage pipes or chimney-pipes for the most advanced condensing value boilers, with these heating installations exhaust gas temperatures of below 100° C. leading to a thermal load of max. 40 to 50° C. Amorphous PET can be produced at a considerably higher production speed, such as 10–20 m/min. Additional heat retention is not necessary and the productions costs of these simple, thin pipes are reduced by more than 60%.

Moreover, the present invention solves one of the main problems which until now have been preventing commercial processing or reutilization of recycled PET material: PET is hygroscopic and absorbs about 0.5% water from the air. This content of moisture is a main problem in processing and it is the reason why PET, until now, has been used industrially as an original material for composite fiber material ("Trevira" of the Hoechst company) and for the above-mentioned drinking bottles only; processing of PET which has not been dried separately and which possibly contains even trace amounts of moisture, therefore, leads to a chemical reaction referred to as thermal hydrolysis which completely destroys the polymer chains of the PET material and converts the polymeric substance into an unusable, highly liquid, monomeric mass of low viscosity. Therefore, until now processing of PET, for example as a granulate, has only been possible after time-consuming and expensive pre-drying and by keeping it dry in the packing until use. Particularly for simple, inexpensive and flexible processing, however, this material has not been available until now, all the less for manufacturing mechanically tough and resistant moulding bodies.

Any plastic body can be regarded as a moulding body in the sense of the invention, which can be manufactured by means of an appropriate plastic moulding process, such as most preferably extruding, injection moulding and blow moulding processes.

Moreover, the invention also comprises the manufacture of sectional or rod elements which are not manufactured in the form of a tube but which can equally make use of the particular, advantageous mechanical effects of the used crystalline PET material.

Independent protection in the scope of the invention is claimed for the use as plastic pipe, in particular as a chimney-pipe which has been manufactured by using the PET material and in this connection it is not decisive that this material is present in a crystalline state. According to the invention it is rather claimed that the pipe is manufactured by the use of crushed PET bottles, by subsequently kneading and allowing the residual moisture to escape in the form of vapour.

This aspect of the invention allows the use of even amorphous PET materials, which have been produced by cooling down in a direct recycling process, without the production of granulate, for applications without high thermal load, such as cable conduits, drainage pipes or chimney-pipes for the most advanced condensing value boilers with exhaust gas temperatures of below 100° C. leading to a thermal load of max. about 40 to 50° C. Amorphous PET used according to the invention, for example, can be used at considerably higher production speed, such as 10 to 20 m/min in the case of pipe manufacturing. In addition to that, by avoiding the slow cooling down which, for example, would be necessary to obtain the crystalline state, the manufacturing process is considerably simplyfied thus leading to an increase in efficiency of up to about 60% as, for example, in the case of simple pipes.

Additional independent protection is claimed for a use of the crystalline PET produced in the aforementioned way, for applications in the building, water or electronic sectors, as for example downpipes, gutters or the like, as well as cable conduits. Besides, for the material to be produced according to the invention typical fields of application would be window frames or window sections (the crystalline PET would be a particularly inexpensive substitute for rigid PVC) as well as roof tiles or the like coverings.

An additional field of application would be the construction of vehicles or automotive engineering. The tough, resistant crystalline PET material would be particularly suitable for car body parts, such as mudguards or doors, as well as for wheel rims and the like components which are subjected to mechanical stress and have been primarily manufactured of sheet steel or aluminium until now.

A further field of application which is claimed in the scope of the invention would be the sports and recreational sectors; the resistant, tough PET material in crystalline state, for example, could be suitable for the production of bearings for roller blades or the like sports equipment.

Further advantageous developments of the invention are described in the dependent claims.

Furthermore, these or other fillers also serve as crystallisation accelerators which are particularly useful for the generation of the crystalline state of the PET material, which is advantageous according to the invention.

While it is particularly preferable, according to the invention, to use a kneading unit having both a rotating and axially oscillating mixing screw, principally any mixing unit could be possible for the realization of the invention, which ensures a comparable mixing effect—homogenization while allowing water vapour to escape.

By means of the proved, particularly advantageous mechanical properties as well as by the PET material which can be made available at low cost and which has been hardly recyclable until now, a possibility has been shown according to the invention of how potential ecologically problematic materials can be used in an appropriate, technically efficient and advantageous way.

Even with amorphous PET which is used according to the invention, it is particularly advantageous that this material changes its structure—gradually—towards the more tough crystalline PET under the influence of heat as, for example, when being used as a chimney-pipe.

An essential further development of the present invention is the processing of the crystalline PET produced and used according to the invention, by foaming, for example by means of a foaming agent, whereupon workpieces are formed which show a considerably lower specific gravity although their mechanical stability has been reduced insignificantly only. Furthermore, foaming agents show the advantageous effect that because of the gaseous foaming agent cooling-down of a formed product would be delayed thus further stimulating the generation of the crystalline state in the material. As an example for processing it is referred to the so-called integral foam injection.

Since PET is a generally long-chain polymer, it is especially in the case of injection moulding that a detail dissolution cannot be obtained in any amount because of the flow properties of the material. By adding appropriate additives, such as paraffins, stearins, wax or the like, to the liquid mixture, however, the friction both between the individual polymers (polymer chains) and between the latter and the moulding nozzles can be reduced considerably by the thus obtained wetting effect so that in particular for injection moulding processes or the like the working properties can be clearly improved.

According to the invention it is preferable to add a slip additive, such as sodium montanate in the amount of 0.1 to 3.0% by weight to the liquid PET, more preferably between 0.2 and 0.5% by weight.

BRIEF DESCRIPTION OF THE DRAWINGS

Further advantages, characteristics and details of the invention will become more clearly understood from the following description of preferred embodiments, as well as from the drawings, which show in FIG. 1: A schematic function diagram of a preferred embodiment of the device according to the invention for the manufacture of chimney-pipes, namely the dosage, mixing, discharging and extrusion units;

FIG. 2: Units arranged downstream the installation according to FIG. 1, for moulding the chimney-pipe as well as for subsequently controlled cooling of the manufactured pipe;

FIG. 3: A flow diagram with the essential process steps of the manufacturing process according to the invention;

FIGS. 5 to 10: Examples of pipes manufactured in accordance with the invention.

DETAILED DESCRIPTION

Figure 1:
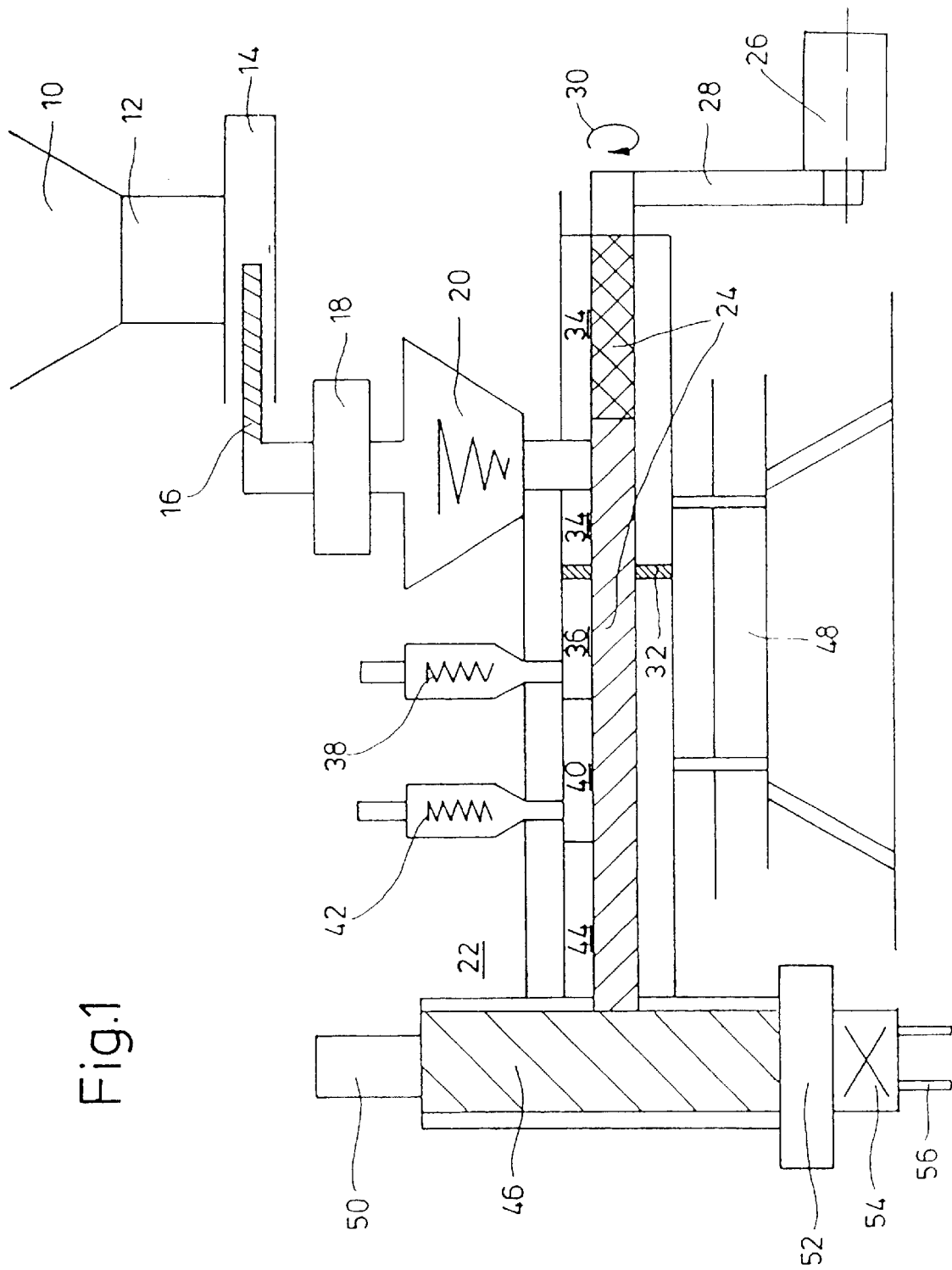

The installation shown in FIGS. 1 and 2 is suitable to manufacture chimney-pipes or chimney-pipe modules from PET (polyethylene terephthalate, also abbreviated as PETP) in accordance with the invention. Chimney-pipes of this type normally have a length of between one and five meters and have a common external diameter of between 75 and 250 mm or more. Usually, pipes of this type have a one-piece connection sleeve section additionally fitted.

Such PET exhaust or chimney-pipe modules are manufactured, according to the invention, from PET base material, for example from ground bottles made of PET, which is available on the market, already crushed and cleaned, as a very low-priced, recycled, mass raw material. This material is available in commercialised flake shape—edge lengths of the flakes between about 2 and 6 mm. It is ground, being reduced to approximately 2 to 10% of its original granulation, before application in a process according to the invention or actual manufacturing of pipes according to the invention. This ground material is then fed as a starting material into the receiver, shown in FIG. 1, or the material funnel 10 of the illustrated installation. Through a dosage flap 12 and a downstream differential dosage scale 14, the received material is then weighed and fed by a discharge screw 16, in an appropriate dosage, through a metal separation unit 18 (electrically operating), to a supply funnel 20 of a Buss Ko kneading unit 22, which is essential for this shown installation.

Through further addition of weighed, pulverized adding material in dry form via an additional differential dosage scale together with the ground PET material to the funnel 20 to the zone 34, the moisture in the PET mixture to be disintegrated can be gradually reduced. This can also serve to prevent a thermal hydrolysis, e.g. 20% mica in zone 34 and 20% mica through 38 in zone 36.

While the metal separator 18 is provided for removing possible metal remnants from the supply material, the appropriately adjustable dosage scales allow, according to the set process parameter, an optimum quantity of ground PET flakes and additives to be fed to the installation in each case.

The kneading unit 22, as the central mixing element, shows an axially oscillating (in FIG. 1, in a horizontal direction) screw 24, which is driven by a drive motor 26 as well as a driving chain 28, in the direction of rotation according to the arrow 30; during that turning movement the oscillating screw 24 describes an axially oscillating movement.

The inner mixing area of the kneading unit 22 which surrounds the oscillating screw 24 shows teeth or guiding pieces surrounding it and extending to the interior (not further described in the Figure). These interact with the screw, through appropriately designated slots, without touching it and provide the desired kneading effect. Alongside the approximately 1 meter long screw, as shown in the embodiment, a division of the interior in various kneading or mixing zones is possible: Therefore, a feeding zone 34 is formed underneath the feed funnel 20, being limited by a choke ring 32 with helical grooves on the left-hand side, which has a circulating water cooling system which is not shown. A mixing zone 36 is connected to the choke ring of the left-hand side and, in the area of the mixing zone 36, suitable additional material, as an additional feed aggregate, can be supplied through a first stuffing mechanism 38. In the following homogenisation zone 40 an additional stuffing mechanism 42 is provided for, to which a discharge zone 44 of the Buss Ko kneading unit 22 is connected.

Fed through the funnel 20, the PET supply material can then travel through the zones 34, 36, 40 and 44, until it is discharged by the discharge screw 46, for immediate extrusion processing. A schematically outlined base unit 48 supports the kneading unit 22 which is horizontally arranged in the illustrated embodiment.

The kneading unit 22 is heated up to a temperature of between about 280 and 300° C. by means of thermal oil, associated pumps (not shown) being electronically controlled and, advantageously, connected via magnetic couplings to the drive units which belong thereto. In particular, in this way, the screw (24) is also heated internally with oil.

Essential for the treatment of the ground PET flakes is the fact that residual moisture—even pre-dried PET flakes have a residual moisture content of between about 0.5 and 1% by weight of water—can continuously escape in a controlled manner during the mixing and kneading process in the Buss Ko kneading unit. Accurately speaking, the supply material is heated in the feeding zone 34 due to the rotating and oscillating movement of the screw 24, and is pressed against the choke ring 32 in such a way that the initial moisture of the supply material evaporates. It is able to escape, partially via the supply funnel 20 against the flow direction of the hot mass, or else at the $1^{st}$ stuffing mechanism in the flow direction of the hot mass, without a commonly used vacuum pump. On the path of the viscous material, passing the zones 34, 36, 40 and 44 toward the discharge screw, is an additional stuffing mechanism 42 acting as a $2^{nd}$ escape. There, due to a mass temperature of above 270° C., the remaining moisture and acquired moisture from the added materials can escape. Totally without pressure, and relaxed, the viscous and hot mass is then transferred to the discharge screw 46, where, with a $3^{rd}$ escape via a common vacuum pump, the residual moisture is drawn off. Especially this fluctuation of gradual moisture withdrawal and addition of additives (crystallisation pellets) and the almost open homogenisation in the Buss kneading unit is new. In this way, it is effectively avoided that this residual moisture can react with the plastic mass through thermal hydrolysis, which destroys the polymer chains and makes the working material useless.

In addition to that, additives can be supplied via the first stuffing mechanism, which can both serve to increase the mechanical strength of the end product to be produced, and dye or act as crystallisation accelerator. As additivies, glass fiber, mica, chalk, barium sulphate, glass pellets, other technical fibers such as aramide or carbon fibers, colour pigments or normal flame protection agents can be taken in consideration. Particularly after feeding through the $1^{st}$ stuffing mechanism 38 in the actual mixing zone 36, these are mixed with the mixture supplied through the choke ring 32 and then homogenised in the succeeding homogenisation zone 40. The second stuffing mechanism 42 arranged at this position, makes it possible that remaining gases, especially any remaining residual moisture, can escape from the already viscous material in the kneading unit 22; in so far the second stuffing mechanism 42 acts as an escape opening as well. At this position within the installation, the viscous PET material usually reaches a temperature of above 270° C.

The visous mass is then delivered by the discharge screw 42, in FIG. 1 shown downwards, in a horizontal direction, the screw 46 being driven by means of a riding, schematically shown drive motor 50, with a steady delivery motion, so that downstream extrusion dies can be supplied.

Precisely speaking, a sieve changer (e.g. Gneuss sieve changer) is allocated downstream of the discharge screw 46, with which possible remaining impurities can be filtered from the mass. Such a sieve changer is useful particularly for the recipes, in which none, or only pulverized additives are mixed, so that also at this stage, substances and matter such as wood, paper, sand grains, thermoplastic matter such as Teflon, ETFE, and PFA that interfere with the homogeneity of the end material, can be filtered out of the mass.

For a possible exact control and dosage of the ensuing extrusion process, a separate melt pump 54 is connected downstream. Attached to this is installed an extrusion die 56, as schematically shown in FIG. 1, to form the pipe to the desired diameter from the supplied mass, as in the present case. According to the invention and advantageously, the extrusion die is already adjusted to an approximation of the intended final dimensions (the intended diameter) of the pipe. During subsequent moulding of the pipe by pressurised air from the interior, practically no, or only minimum deformation of the extruded mass will be necessary; since tests have shown that PET develops a very strong memory effect in mechanical deformation, in this way, an extraordinary stability and toughness of the end product, even after repeated heating, e.g. as with a warm chimney-pipe, can be achieved.

Further, it is essential for the process according to the invention that the extruded pipe is cooled only slowly in combination with the following processing in the intended final shape: According to the invention, the aforementioned kneading process within the installation makes it possible that the PET material is present in crystalline form, which is advantageous according to the invention and which can be further improved by the addition of adequate crystalisation pellets as additives. To prevent the material which is discharged from the installation, from returning to the undesirable amorphous structural condition through cooling too quickly, measures have been taken, which are described in the following in connection with FIG. 2, to ensure that the pipe is cooled down slowly during the moulding process.

As shown in FIG. 2, by means of a controlled extrusion of the kneaded PET mass through the extrusion die 56, the melting pump 54 produces a formed body showing already approximately the desired and final pipe diameter. A respective pipe end is then held by means of a tow plug 58 of a corrugator 60 (i.e. a device for manufacturing pipes which is realized by means of chains 62 running parallel to each other—in FIG. 2 shown in disassembled view—(for example produced by the company Drossbach, Rain am Lech), and is led in the direction of arrow 64 in FIG. 2. At the same time, as indicated by the pair of arrows 66, an overpressure is produced from within the corrugator 60, which presses the pipe walls, which are still soft, radially towards the exterior (the so-called supporting air). The lamella of the tow plug are of temperature resistant Viton elastomer and ensure that supporting air is formed by a compressor, so that the pipe walling is put against the corrugator and is transported out of the latter. The tow plug is heated individually, preferably to about 130° C.

While it is usual in the commonly known manufacture of plastic pipes that, for example, a PP pipe extruded in a known way is quickly cooled by cold water being applied from outside, via vacuum calibration, for the present process heat released from the extruded material (pipe) is continuously fed to the die, thus ensuring that the temperature drop during the passage through the corrugator 60 is decreased. Typically, an extruded PET chimney-pipe which is entering the corrugator at a temperature of the material of about 280° C. still shows a temperature of about 180° C. at the exit side, with a typical production speed of about 1 m/min. Besides, according to the latest state of the art, vacuum can be applied in addition to supporting air from outside through fine slots provided for in the corrugator. This ensures an even better moulding result and increased production speeds.

To further support the slow cooling of the pipe according to the invention, a tunnel unit 68 which is heat insulated and adjustable or foldable in diameter is arranged downstream of the corrugator 60, thus further delaying the cooling of the pipe; typically, within a tunnel unit having a length of 3 meters, the pipe is cooled from about 180° C. at the exit side of the corrugator to about 100 to 80° C. at the end of the tunnel 68. The pipe is then further cooled in the air to about 75 to 70° C. A pull-off unit 70 in the form of a caterpillar pull-off (shown is the front view) which is illustrated schematically in FIG. 2 at the end of the tunnel unit 68, allows the controlled extraction of the cooled pipe from the tunnel unit 68. A pull-off mechanism of this type is dispensable, however, when according to an advantageous further development of the invention the delivery, extrusion, moulding and cooling units, namely the units 46, 56, 60 and 68, are placed above each other in a vertical drop direction: In this way, a rack is necessary having a height of approximately 15 to 20 meters, which also supports the feeding and kneading units. Because of this arrangement, the constant and easy extraction of the pipe from the installation seems to be ensured in a particularly simple way due to the effect of gravity and should possibly justify the additional constructional efforts.

Furthermore, for improving transportation of the pipe it is possible to form a continuous groove or notch in the pipe casing. This groove can be arranged, for example, where single jaws of the chains 62 butt together in the corrugator, which makes the vertical arrangement unnecessary.

For retaining the desired high processing temperatures, the corrugator is heated externally, for example by means of an adequately installed thermal oil heating system, preferably at least until the heat released from the workpiece provides sufficient heating. Therefore, particularly in the downstream tunnel unit 68, usually an additional heating is not necessary due to the fact that the own heat of the workpiece keeps the temperature sufficiently high and ensures the intended slow cooling with the respective low temperature gradient.

Common diameters of the manufactured chimney-pipes are 63, 75, 90, 110, 125, 140, 180, 200, 250 and 315 mm, which are then cut to length according to the final product. Common lengths are 150, 250, 500, 1000, 2000, and 5000 mm. It is further preferable that a connection sleeve (socket) can be formed already during the pipe moulding process (because of the increased danger of a memory effect in the area of such sleeves, it is especially advantageous to add suitable stiffening fibers).

Depending on the intended use, it has shown to be favourable to mix to the processed quantity of PET between about 5 and about 60% by weight of additives; in general, common mineral additives should be mentioned, such as chalk, mica, talcum, barium sulphate, etc. In addition, fibers such as glass, carbon, aramide, natural fibers, graphite, molybdenum sulfide, Teflon, PVDF (increases the flame protection and UV resistance), etc., as well as glass pellets, hollow glass pellets, or generally flame protection agents are suitable as additives. In particular dye material, such as titan dioxide, iron oxide, and others, support the formation of crystallite.

The final product, a PET chimney-pipe which is excellently suitable for the intended use in, for example, a wet chimney, is distinguished by extraordinary material properties due to the material's crystalline structure produced according to the invention; the following table shows a comparison between the PET chimney-pipe (in the illustrated embodiment shown with a glass fiber content of 15%) and a conventional PVDF plastic chimney-pipe:

| | Fields of Application | | | |
|---|---|---|---|---|
| | Low-temperature mode + condensing value | Low-temp. mode + solid sections | Low-temp. mode + solid sections | Condensing value mode |
| Properties | PVDF | PET + fiber glass | crystalline PET | amorphous PET |
| Density | 1.78 g/cm$^2$ | 1.60 g/cm$^a$ | 1.38 g/cm$^3$ | 1.34 g/cm$^a$ |

-continued

Fields of Application

|  | Low-temperature mode + condensing value | Low-temp. mode + solid sections | Low-temp. mode + solid sections | Condensing value mode |
|---|---|---|---|---|
| (DIN 53 478) Modulus of elasticity | 1.500 MPa | 8.500 MPa | 3.000 MPa | 2.100 MPa |
| (DIN 53 457) Vicat softening temperature process B/50 | 140° C. | 215° C. | 190° C. | 73° C. |
| (DIN 53 480) Crystallite melting temp. | >170° C. | 250–255° C. | 250–255° C. | 250–255° C. |
| (DIN 53 736) Shape permanence to heat (DIN 53 461) | 85° C. | 215° C. | 160° C. | 90° C. |

Figure 4:
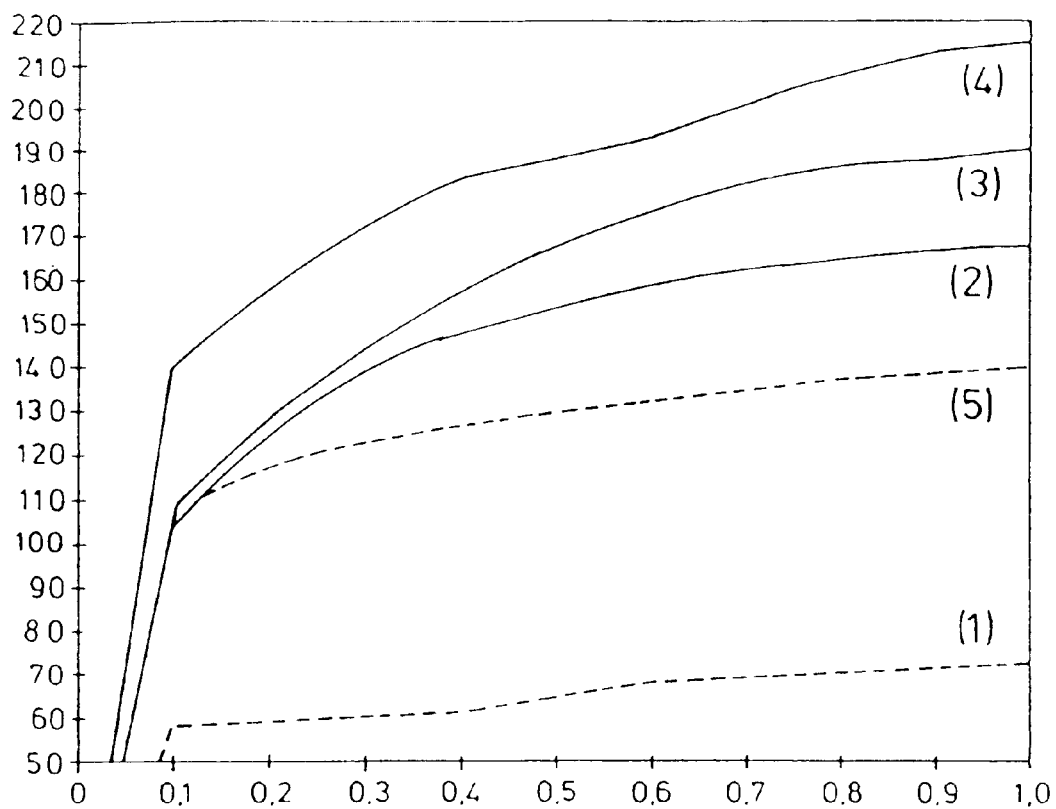
FIG. 4: Measuring diagrams with regard to the Vicat hardness of the PET material.
Figure 7:
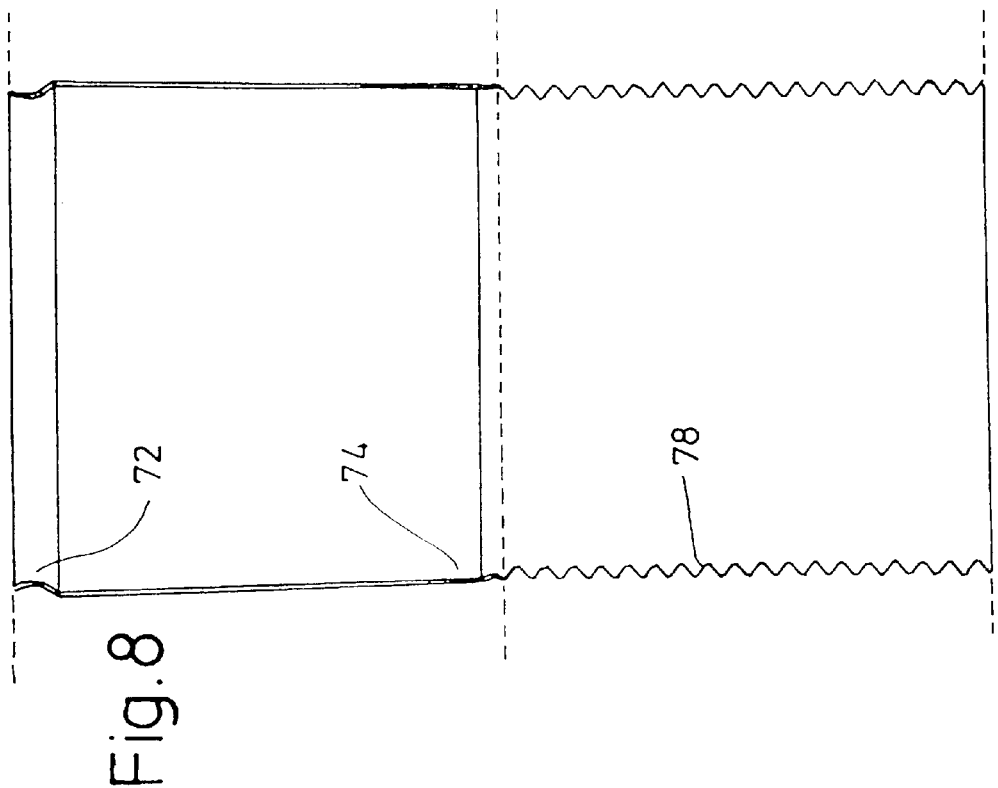

It turned out that the material used according to the invention shows excellent mechanical properties which make it particularly suitable for the intended purpose; see also FIG. 4 which illustrates a comparison of graphs obtained during a Vicat B50 measurement explaining the excellent properties of the crystalline PET material produced according to the invention. Graph (1) shows the rather low results for amorphous PET; crystalline PET produced according to the invention is shown in graph (2) in the form of a double graph—provided with and without colour; PET containing a crystallisation stimulating nucleation agent as well as glass fiber in the amount of 10% by weight is shown in graph (3), and the same material containing glass fiber in an amount of 30% by weight is shown in graph (4).

Compared to these graphs, a measurement with PVDF is shown in graph (5).

While particularly thin-walled chimney-pipes, in the illustrated example additionally supported by compressed air (supporting air), are manufactured of the crystalline PET material according to the invention, it is also possible to manufacture, for example, solid bars, sections or the like elements.

Although the described installation shows an operational capacity of about 60 kg per hour (corresponding to about 12 pipes of 5 m length each with a pipe diameter of 75 mm) at a feed rate of the extruded pipe of about 1/min, those skilled in the art may conceive other appropriate parameters or throughputs.

In particular, it is also within the scope of the invention to use the PET material without any additives; even in this case the desired crystalline state of the material is obtained by merely cooling down the same according to the invention.

Longer corrugators and longer heat retaining tunnels (68) allow the production capacity to be increased almost as much as desired by increasing the throughput (larger kneading unit).

Referring to FIG. 3, the manufacturing process will now be described again explaining the most essential process steps. While in step S1 the PET material is crushed and finely ground ad desired, metals or other impurities are subsequently removed in an appropriate way so that in step S2 the material is homogenized according to the invention in the Buss Ko kneading unit so as to allow the remaining moisture to escape in the form of a gas; in step S3 fillers are exactly weighed out and added in an appropriate way during this kneading and mixing process while remaining moisture and moisture from the additives is removed by the almost open homogenization to prevent thermal hydrolysis.

In step S4 the mixture is then discharged, degassed by means of a vacuum pump and immediately supplied to the extrusion process, particularly, without granulating the material in the meantime, for example. In step S5 the pipe is moulded as desired and in step S6 it is slowly cooled down according to the invention so that the crystalline structure of the material can be formed.

Finally the desired pipe can be cut to length or further processed.

While the technical teaching of this invention as described above is especially aimed at the manufacture of plastic pipes and, in particular, of chimney-pipes made of crystalline PET material thus realizing according to the invention considerable advantages which are also related to the process, it is also possible and within the scope of the invention to alternatively produce not only solid bars or sections but also crystalline PET granulate which is capable of being further processed. For this purpose a corresponding granulating unit is provided for as extrusion die which then produces granulate of the PET material being discharged from the kneading unit. Further, it is necessary to pre-dry the PET granulate prior to packing in order to keep it processible and to prevent it from being destroyed by moisture. For such a regranulating process the temperature of the material should be as high as possible when being fed to the granulating extruder so that energy can be saved. For example, preheating of the granulate could take place in a fluid mixer (Henschel) at 140° C. In this case the temperature is almost 100° C. higher than with ordinary plastic materials such as PE, PP, etc. Advantageously, it is also possible to cool down the produced hot material and to heat cold raw material by means of a heat exchanger. By using an appropriate heat exchanger, for example, warm granulate slides down inside and granular flakes are preheated at the outside, thus increasing the operating capacity and decreasing energy consumption at the same time. Furthermore, ground material, so-called PET flakes, are melted in a gentle way.

By granulating at high temperature and short-time dipping into cooling water, the granules having a diameter of about 5 mm are cooled down abruptly. Remaining water is removed through an inclined vibrating screen. Heat stored inside the granules dries the outer skin of the latter and, particularly during the transport on the vibrating screen and later on while the granulate is conveyed to the final drying unit or to the heat exchanger, the structure of each individual granule changes from the amorphous to the crystalline state. Advantageously, even smallest amounts of colour pigments or mica prevent the granules, showing a temperature of about 200° C., from sticking together.

The granulate produced according to the present invention will be particularly useful in the case of the—otherwise known—extrusion blowing of special plastic mouldings, such as T-pieces, bends, flanges and the like elements.

In addition to its excellent mechanical and process-related properties, an essential aspect for manufacturing chimney-pipes of crystalline PET material according to the present invention is its outstanding economic efficiency. PET material coarsely ground from drinking bottles is available in large quantities and at relatively low cost, because an appropriate subsequent processing has not been provided for until now. In addition, compared to common injection moulding and extrusion processes as well as plastic materials used therein, handling of PET material is further complicated because of the problems regarding moisture, as described above. Therefore, until now there has been no reason to take care of PET material, particularly for the use in chimney-pipes.

Nevertheless, it is not only their mechanical properties which make pipes manufactured according to the invention and in consideration of the necessary process steps superior to common plastic chimney-pipes. Preliminary calculations have shown that cost reductions of up to 80% can be achieved. A cost advantage can even be obtained in a direct comparison with chimney-pipes made of stainless steel, which are considered as a substitution product. It seems as if a critical lower limit has been reached with the thin wall thicknesses of steel that are produced meanwhile. And here as well, the economical and technical advantages of PET material appear to be considerable.

Contrary to common plastics, PET shows excellent glueing properties which offer new and inexpensive possibilities.

According to a preferred embodiment, a slip agent is added to the PET material to be processed, in the form of an additive. Said slip agent proves in so far advantageous, for example during an injection moulding process, as the flow properties of the long-chain PET polymers are clearly improved because of its wetting effect, thus reducing the friction between the polymer chains on the one hand, and the friction between polymer and moulding nozzles on the other hand.

Slip agents such as paraffins, stearins or wax are preferably used as additives of that kind. In addition to the fatty acid esters of trimethylol propane or pentaerythrite and the montanic acid esters, also montanic esters containing soap are preferably used. These are particularly suitable for glass fiber reinforced products. Montanic acid triglyceride, for example, is especially migration resistant and, in particular, sodium montanate shows a nucleating effect (it is used as a nucleating agent for supporting crystallisation) in addition to the fact that it is a suitable slip agent.

Advantageous additives of that kind can be preferably added to the liquid PET material in an amount of between 0.1 and 3% by weight; particularly preferable is the addition in an amount of between 0.2 and 0.5% by weight.

FIGS. 5 to 10 illustrate new pipe variants which are preferably manufactured by using the PET material produced according to the invention. The embodiment shown in FIG. 5, for example, continuously consists of a plain sleeve 72 and an immersion piece 74. With a nominal diameter w=110 mm, for example, each corrugating segment (having a length of 1=106 mm) of the pipe consists of a sleeve followed by an immersion piece. A corrugator used for the production consists of 36 segments, i.e. 2 bars of each 1.90 m length less 10 cm immersion piece=180 cm overall length. Lengths of less than 2 m are advantageous for transport purposes; components of less than 2 m length are transported at extremely low prices both by mail and UPS.

Therefore, the pipe can be cut at a distance of 10 or 20 cm each and its end can be provided alternatively with a sleeve or an immersion piece. This is important for the insertion of an inspection opening which has to be provided for in the section of the smoke pipe or in the rising pipe below a roof.

The inside diameter w of the sleeve is selected so as to guarantee at the same time that with all nominal diameters the corresponding flexible pipes can be installed to fit well. With epoxy resin, polyurethane, cyanacrylate or polychloroprene adhesives, hard or soft tight glued joints can be obtained. In the case of chimneys, tight joints are necessary for operation at overpressure (condensing value). Plug-type joints which are not tight can be used for atmospheric (vacuum) gas boilers.

Figure 8:
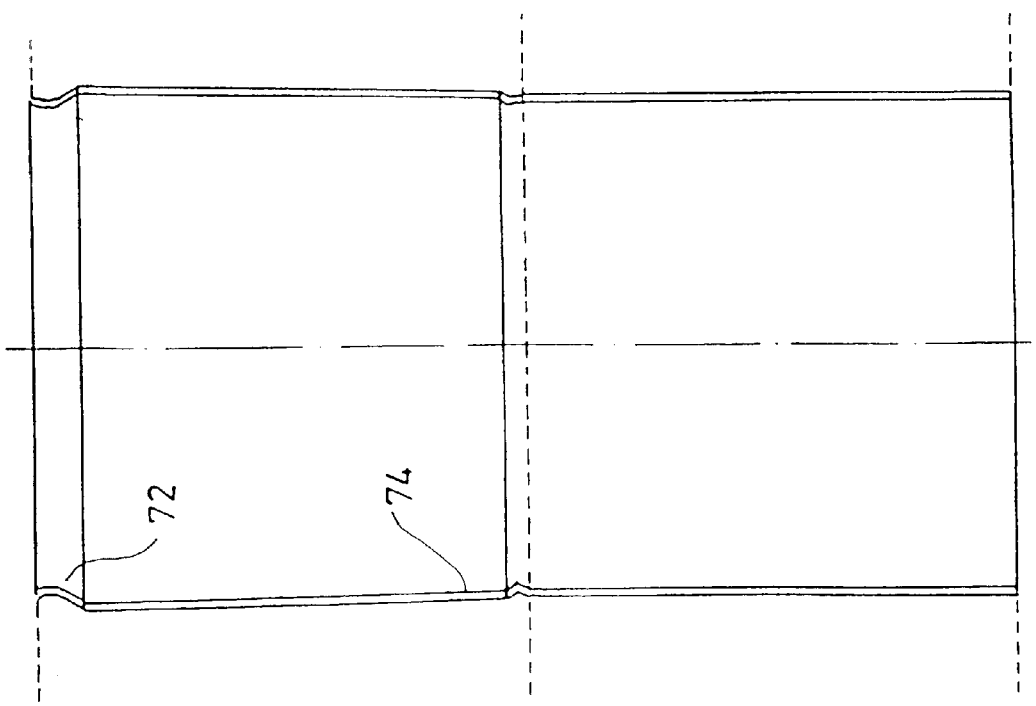

FIG. 5 shows a bar-shaped arrangement of sleeve segments which can optionally be separated as described above (FIG. 7 illustrates a one-part or single segment) and in FIGS. 6 and 8 preferred embodiments are shown. The embodiment shown in FIG. 6 contains a sleeve segment at one end only and is then continued in a long extending section. Contrary to that, FIG. 8 shows a corrugated section 78 arranged adjacent to an immersion piece 74.

Figure 10:
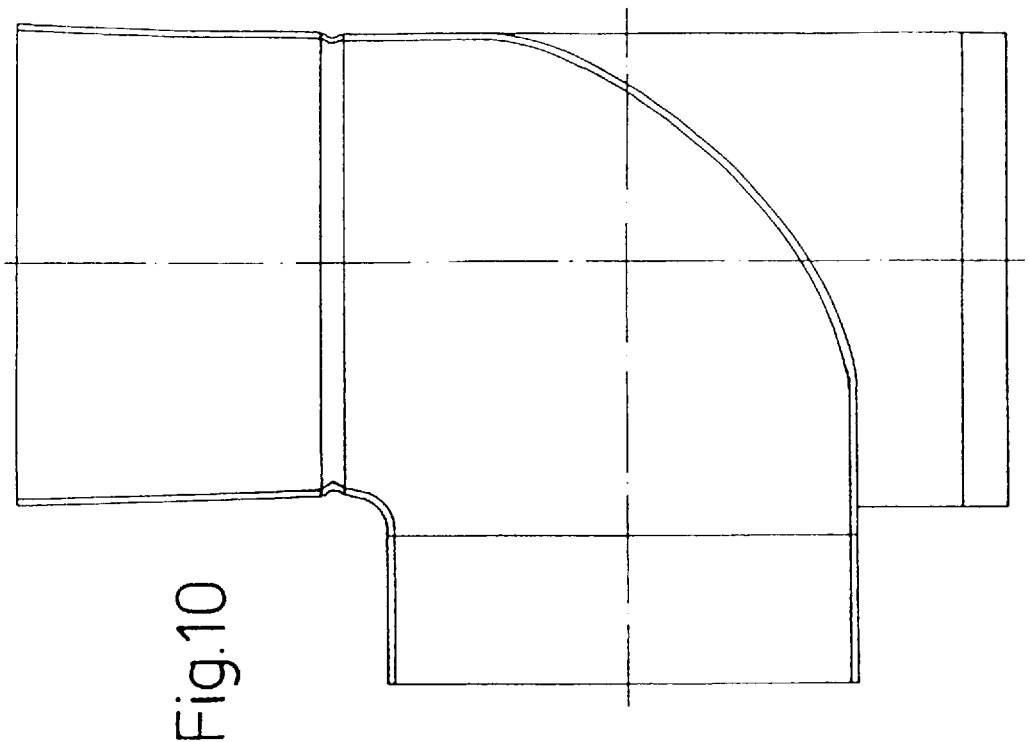
Figure 9:
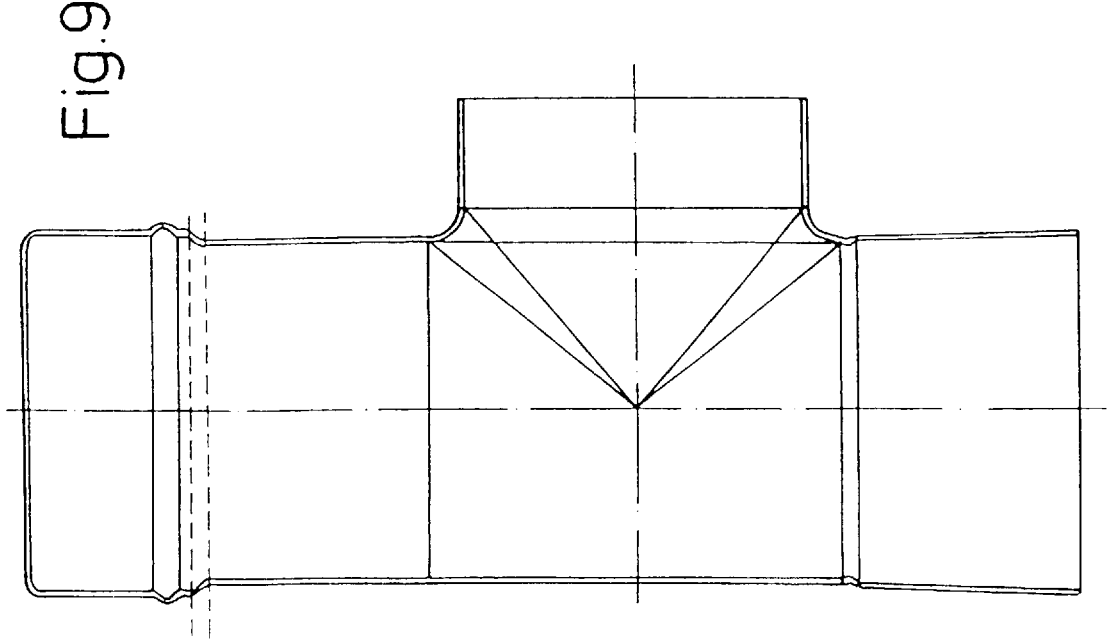

FIG. 9 shows an associated T-piece which is preferably produced by means of a blow moulding process, thus being rather inexpensive. Condensate can be discharged easily through the inner curves. FIG. 10 finally shows an appropriate elbow section.

Therefore, pipes can be manufactured in the way according to the invention, which most favourably implement the advantages of crystalline PET material at extremely low production cost and with an optimum flexibility with regard to its application as well as adaptation to given dimensions at the place of application.

What is claimed is:

1. A process for manufacturing plastic pipe from a recycled, crushed PET starting material comprising:

providing a source of recycled, crushed PET starting material;

feeding the starting material to a kneading unit;

kneading the starting material under the influence of heat and removing moisture from the kneading unit to prevent hydrolysis and to form a homogenous, substantially moisture free, process viscous mixture;

feeding the viscous mixture to an extruder; and providing the extruded mixture to a corrugator while cooling at a temperature gradient of between $-10°$ C./min and $-50°$ C./min so as to form a crystalline plastic pipe.

2. A process according to claim 1, wherein the PET starting material is obtained by crushing PET drinking bottles.

3. A process according to claim 1, including the step of adding fillers having mechanically reinforcing, crystallisation stimulating, UV stabilizing and flame resisting properties to the PET starting material.

4. A process according to claim 1, wherein the step of kneading takes place at a temperature of between 230 and about 320° C.

5. A process according to claim 1, wherein the temperature gradient is between $-20$ and $-40°$ C./min.

6. A process according to claim 1, wherein mixture feed to the extruder is at a temperature of between 250 to 300° C.

7. A process according to claim 1, including cutting the cooled plastic pipe to desired pipe length.

8. The process according to claim 7, wherein the fillers are selected from the group consisting of glass fibers, mica, chalk, barium sulphate, glass pellets, aramide fibers, carbon fibers, PVDF, colour pigments, flame protection agents and mixtures thereof.

9. The process according to claim 8, wherein the fillers are added in an amount of between 2 and 60% by weight.

10. A chimney-pipe manufactured in accordance with the process of claim 1.

* * * * *